United States Patent
Lavallee et al.

(10) Patent No.: US 7,136,804 B2
(45) Date of Patent: Nov. 14, 2006

(54) SYSTEMS AND METHODS FOR PROVIDING USERS WITH INFORMATION IN AUDIBLE FORM

(75) Inventors: Lionel Lavallee, Placerville, CA (US); Peter Petersen, Trenton, NJ (US); Gregory Pavlik, Delran, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 823 days.

(21) Appl. No.: 10/283,770

(22) Filed: Oct. 30, 2002

(65) Prior Publication Data

US 2004/0088154 A1 May 6, 2004

(51) Int. Cl.
*G06L 17/28* (2006.01)

(52) U.S. Cl. .............................. 704/4; 704/2; 704/270; 704/275

(58) Field of Classification Search ................ 704/2, 704/4, 270.1, 275
See application file for complete search history.

(56) References Cited

U.S. PATENT DOCUMENTS

| | | | |
|---|---|---|---|
| 5,899,975 A | 5/1999 | Nielsen | |
| 6,240,448 B1 | 5/2001 | Imielinski et al. | |
| 6,243,443 B1 | 6/2001 | Low et al. | |
| 6,269,336 B1 | 7/2001 | Ladd et al. | |
| 6,587,822 B1 * | 7/2003 | Brown et al. | 704/275 |
| 6,707,889 B1 * | 3/2004 | Saylor et al. | 379/88.04 |
| 2003/0046316 A1 * | 3/2003 | Gergic et al. | 707/513 |
| 2005/0223408 A1 * | 10/2005 | Langseth et al. | 725/86 |

FOREIGN PATENT DOCUMENTS

| | | |
|---|---|---|
| WO | WO 00/05638 | 2/2000 |
| WO | WO 00/05643 | 2/2000 |

* cited by examiner

*Primary Examiner*—Vijay Chawan
*Assistant Examiner*—Leonard Saint-Cyr (57) ABSTRACT

Methods for providing users with information in audible form are provided. One such method comprises determining content sources from which information is to be retrieved for responding to a request from a user, retrieving grammar fragments corresponding to the content sources determined, providing a menu format including information for providing the grammar fragments to the user in audible form, and aggregating the grammar fragments retrieved such that the grammar fragments can be provided to the user in audible form in conformance with the menu format. Systems and computer-readable media are also provided.

33 Claims, 9 Drawing Sheets

```
/**
 * Self-describing information about this portlet for voice
 */
protected static String VOICE_DESCRIPTION_BEGIN =
    <prompt bargein=true>acme stock quotes</prompt>
    <grammar>
        <![CDATA[
            (acme stocks) {<option quote>}
            (acme stock quotes){<option quote>}
        ]]>
    </grammar>
    <if cond="service=='quote'">
        <!-
            assign element is dynamically determined
            and added here >
        <assign name="portlet" expr = "some action"/>
        <submit expr="portlet"/>
    </if>
```

```
<%@ page contentType="text/html" session="true" %>
<%@ taglib uri="/WEB-INF/portal-view.tld" prefix="view" %>
<view:client/>
<view:select>                                                    1010
   <view:when contentType="text/html">
      <html>
         <head>
            <link rel="stylesheet" href="portal.css?laf=test">
            <title>hp open portal platform</title>
         </head>
         <body>
            <table width="100%">
               <tr>
                  <td colspan="2" valign="top"><jsp:include page=
"top.jsp"/></td>
               </tr>
               <tr>
                  <td width="25%" valign="top"><jsp:include page=
"left.jsp"/></td><td><view:layout/></td>
               </tr>
               <tr>
                  <td colspan="2" valign="top"><jsp:include
page="bottom.jsp"/></td>
               </tr>
            </table>
         </body>
      </html>
   </view:when>
   <!-- handle case of voice browser -->
   <view:when contentType="text/vxml">
      <vxml>         1030
         <view:page>        1040
            <view:window>        1050                   1020
               <view:layout/>        1060
               <view:transform/>
            </view:window>
         </view:page>
      </vxml>
                                                            810
   </view:when>
</view:select>
```

FIG. 10

```
try {
    if (response.getStatus() == 200) {
        String content = response.getTextContent();
        if (content != null) {
            // check for the root element, if it's not there,
            // we need to aggregate the content into a menu
            if( content.indexOf( "<vxml>" ) == -1 ) {

String selectPrompt = "<prompt>please " +
"indicate your" +
                            "selection</prompt>";
                // add the root element and our
                // menu prompt to the aggregation
                String interim = "<vxml>" +
                            selectPrompt +
                            content +
                            "</vxml>";
                // now let's do the dirty work and
                // transform the aggregation
                VoiceTransformer transformer =
                            new VoiceTransformer();
                String newOut = transformer.transform( interim,
                            "aggregate",
                    invocation.getServletRequest().
                        getSession().
                        getServletContext() );
                // we'll write to the BodyContent
                // through the implicit out
                print( newOut );
        }
    }
```

FIG. 11

```
<?xml version = "1.0" encoding = "UTF - 8"?>
<xsl : stylesheet version = "1.0"
xmlns: xsl = "http://www.w3.org/1999/XSL/Transform">
<xsl : output method = "xml" indent = "yes"
        doctype - public = " - //Nuance/DTD VoiceXML 1.0 // EN"
doctype - system =
"http://voicexml.nuance.com/dtd/nuancevoicexml - 1 - 2.dtd"/>
<xsl : template match = "/" >
<vxml version = "1.0" >
        <form id = "selectServices">
                <field name = "option">
                        <xsl : apply - templates select = " ./vxml/prompt"/ >
                        <xsl : apply - templates select = " ./vxml/grammar"/ >
                <filled>
                        <assign expr = "option" name = "service"/ >
                        <xsl : apply - templates select = ./vxml/if"/ >
                </filled>
                </field>
        </form>
</vxml>
</xsl : template>
        <xsl : template match = "prompt">
        <xsl : copy - of select = "."/ >
        <xsl : template>
        <xsl : template match = "grammar">
        <xsl : copy - of select = "."/ >
</xsl : template>
        <xsl : template match = "if">
        <xsl : copy - of select = "."/ >
        </xsl : template>
</xsl : stylesheet>
```

FIG. 12

```xml
<?xml version="1.0" encoding="UTF-8"?>
<!DOCTYPE vxml PUBLIC "-//Nuance/DTD VoiceXML 1.0//EN"
 "http://voicexml.nuance.com/dtd/nuancevoicexml-1-2.dtd">
<vxml version="1.0">
   <form id="selectServices">
      <field name="option">
         <prompt bargein="true">
            Please repeat one of the following
            to indicate your choice.
            acme stock quotes.
            weather.
         </prompt>
         <grammar>
            <![CDATA[
               (acme stocks)        {<option "quote">}
               (acme stock quotes)  {<option "quote">}
            ]]>
         </grammar>
         <grammar>
            <![CDATA[
               (weather)  {<option "weather">}
            ]]>
         </grammar>
         <filled>
            <assign expr="option" name="service"/>
            <if cond="service=='quote'">
               <assign expr="http://someURL/someAction"
                  name="portlet"/>
               <submit expr="portlet"/>
            </if>
            <if cond="service=='weather'">
               <assign expr="http://otherURL/otherAction"
                  name="portlet"/>
               <submit expr="portlet"/>
            </if>
         </filled>
      </field>
   </form>
</vxml>
```

FIG. 13

SYSTEMS AND METHODS FOR PROVIDING USERS WITH INFORMATION IN AUDIBLE FORM

BACKGROUND OF THE INVENTION

1. Field of the Invention

The present invention generally relates to interactive voice technologies and, in particular, to systems and methods for providing users with information in audible form.

2. Description of the Related Art

Information provided to users by computing devices typically is provided in a graphical form. For instance, a personal computer can be used to access a Web site that provides a user with images and/or text via a display device. In this visual context, it is known to combine graphical information provided by a variety of sources and to display the combined graphical information to the user. This enables a user to visually scan the combined graphical information and identify a topic about which the user desires to receive additional information. Once identified, the user can select the topic, such as by actuating a corresponding icon, and be provided with information related to that topic. Typically, the additional information is presented in a maximized format, i.e., at least some of the previously identified topics are no longer displayed to the user and/or the information is presented on a larger portion of the display device.

It is also desirable to provide information to users in non-graphical form, i.e., audible form. However, creating an audible analogue to the aforementioned visual context has not been adequately achieved. This is because sources of audible information typically provide grammar fragments that, when combined, cannot be interpreted by voice-rendering applications and/or, if renderable, are unnecessarily impractical. For instance, multiple grammar fragments that are received from multiple sources can be stacked (grouped together) to form a valid VoiceXML document. However, a VoiceXML document with stated grammar fragments is not properly formatted for use by a VoiceXML interpreter that typically is used to render (provide voice) corresponding to VoiceXML documents. By way of further example, if each source of audible information provides a grammar fragment that includes "If you would like to access information on ______, please say '______,' " and an interpreter could render the stacked fragments, the user would be provided with redundant audible information, e.g., "If you would like to access information on" is repeated for each source.

SUMMARY OF THE INVENTION

The present invention involves providing users with information in audible form. In this regard, an embodiment of a method in accordance with the invention comprises receiving information corresponding to a request for information from a user, determining content sources from which information is to be retrieved for responding to the request, retrieving grammar fragments corresponding to the content sources determined, providing a menu format including information for providing the grammar fragments to the user in audible form, and aggregating the grammar fragments retrieved such that the grammar fragments can be provided to the user in audible form in conformance with the menu format.

An embodiment of a system in accordance with the invention comprises a menu format including information for providing grammar fragments to a user in audible form, and a voice menu system configured to communicate with a communication network, the voice menu system being operative to determine content sources from which information is to be retrieved for responding to a request from a user, retrieve grammar fragments corresponding to the content sources determined, and aggregate the grammar fragments retrieved such that the grammar fragments can be provided to the user in audible form in conformance with the menu format.

Another embodiment of a system in accordance with the invention comprises means for determining content sources from which information is to be retrieved for responding to a request from a user, means for retrieving grammar fragments corresponding to the content sources determined, means for providing a menu format including information for providing the grammar fragments to the user in audible form, and means for aggregating the grammar fragments retrieved such that the grammar fragments can be provided to the user in audible form in conformance with the menu format.

An embodiment of a computer-readable medium in accordance with the invention comprises logic configured to determine content sources from which information is to be retrieved for responding to a request from a user, logic configured to retrieve grammar fragments corresponding to the content sources determined, logic configured to provide a menu format including information for providing the grammar fragments to the user in audible form, and logic configured to aggregate the grammar fragments retrieved such that the grammar fragments can be provided to the user in audible form in conformance with the menu format.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10 is a portion of code representative of the embodiment of the Java page server of FIG. 8.

DETAILED DESCRIPTION

As will be described in detail here, systems and methods in accordance with the invention involve the use of voice menus for providing users with audible information. The voice menus are constructed by retrieving grammar fragments from voice content sources ("portlets") and then combining the grammar fragments in a manner that can be interpreted and provided to a user in audible form. An embodiment of a voice information system that provides such voice menus to users is depicted schematically in FIG. 1.

Figure 1:
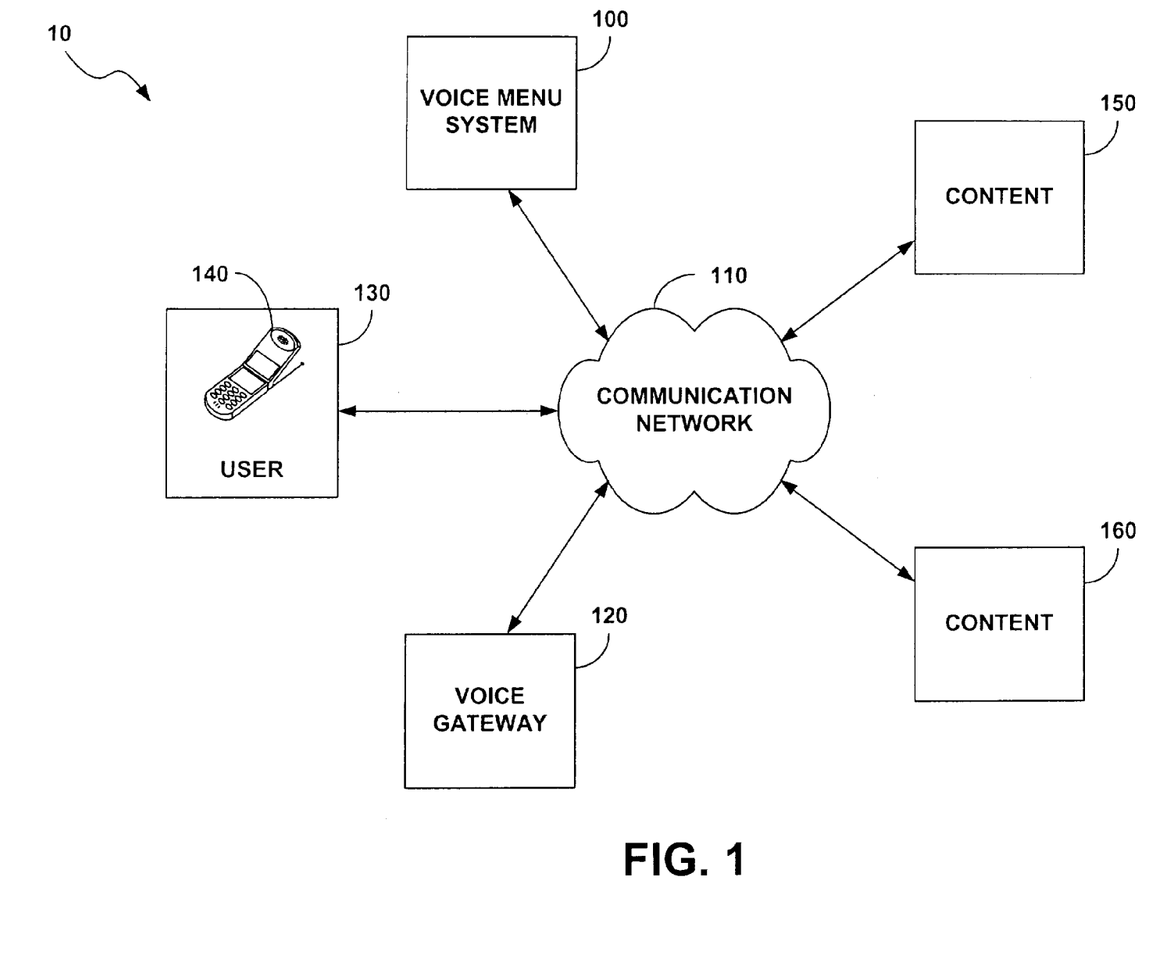
FIG. 1 is a schematic diagram depicting an embodiment of a voice information system in accordance with the present invention.

As shown in FIG. 1, voice information system 10 includes a voice menu system 100 that communicates with a communication network 110. Typically, voice menu system 100 is associated with a portal. A portal, which can be implemented as a server, for example, acts as an information-managing entity that receives requests for information from users, and collects and/or stores information that can be provided to the users in response to such requests. Note, communication network 110 may be any type of communication network employing any network topology, transmission medium, or network protocol. For example, such a network may be any public or private packet-switched or other data network, including the Internet, circuit-switched networks, such as the public-switched telephone network (PSTN), wireless network, or any other desired communications infrastructure and/or combination of infrastructures.

Voice information system 10 also includes a voice gateway 120 that communicates with the voice menu system 100. Specifically, in the embodiment of FIG. 1, voice gateway 120 communicates with the voice menu system 100 via communication network 110. Note, however, that the voice gateway and voice menu system could reside on a single server, for example, and thus not use communication network 110 as shown to intercommunicate.

Voice gateway 120 facilitates interaction of a user with the voice menu system. By way of example, if user 130 intends to interact with voice menu system 100 via a phone 140, the user dials a phone number associated with the user's voice homepage. This establishes a communication link with the voice gateway. The user then speaks into the phone so that an established voice command, which corresponds to contacting the voice menu system, is provided to the voice gateway. For instance, the user could say "contact MyInformation," "MyInformation" being associated with a portal that is used to provide the user with information about which the user is interested.

In response to receiving the established voice command, the voice gateway converts the voice command to a request, such as a Hypertext Transfer Protocol (HTTP) request, and communicates the request to the voice menu system. Note, the request typically is directed to the portal associated with the voice menu system and not to the voice menu system itself, as use of the voice menu system preferably is transparent to the user. Also note that the phone number used to establish communication with a voice gateway can be associated with a particular command. As such, a voice command need not be used to facilitate a request.

The voice gateway also facilitates the flow of information from the portal back to the user. More specifically, the portal provides information to the voice gateway that is converted into audible form, such as by VoiceXML and/or pre-recorded audio, for communication to the user. Thus, the user is able to hear the information provided by the portal via the phone.

FIG. 1 also depicts several sources of content, e.g., content 150 and 160. Content refers to information that is provided to a portal by a portlet. Content typically is provided to a portal and, thus, a voice menu system, via registration and configuration files. These files include self-describing information (described later) pertaining to the portlet and a grammar fragment. The voice menu system uses grammar fragments for providing a user with a menu of available information, e.g., a list of topics about which additional information can be provided.

Figure 2:
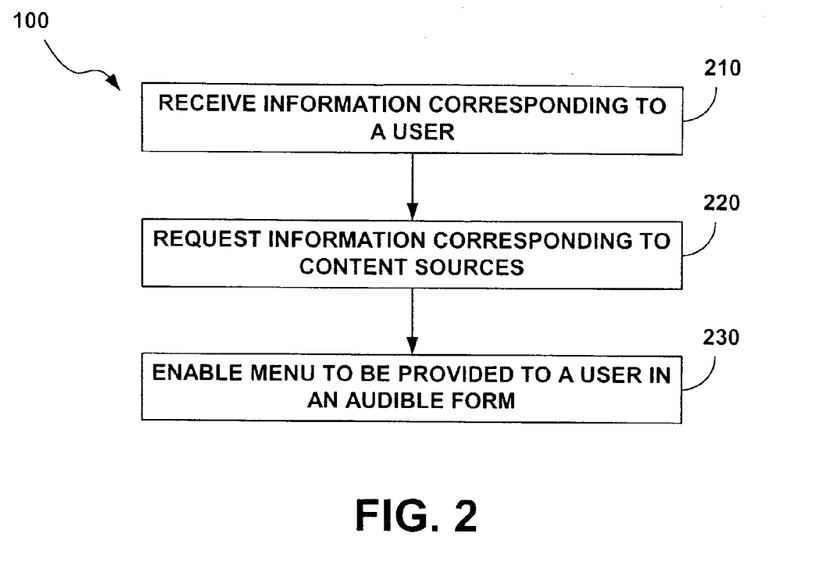
FIG. 2 is a flowchart depicting functionality of the embodiment of the voice menu system of FIG. 1.

Functionality of the embodiment of the voice information system 10 of FIG. 1 is depicted in the flowchart of FIG. 2. As shown in FIG. 2, the functionality (or method) 10 may be construed as beginning at block 210, where information corresponding to a user is received. For example, the information can correspond to a request from the user for information. In block 220, information is requested from at least one content source.

Thereafter, such as depicted in block 230, a menu, which is descriptive of additional information that can be provided to the user, is enabled to be provided to a user in an audible form. Note, the voice menu system 100 constructs the menu so that the menu can be processed by the voice gateway and provided to the user in audible form.

Voice menu systems 100 in accordance with the invention can be implemented in software, firmware, hardware, or a combination thereof. When implemented in hardware, voice menu system 100 can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA). Clearly, other known and/or other technologies, i.e., later-developed technologies, could be used.

Figure 3:
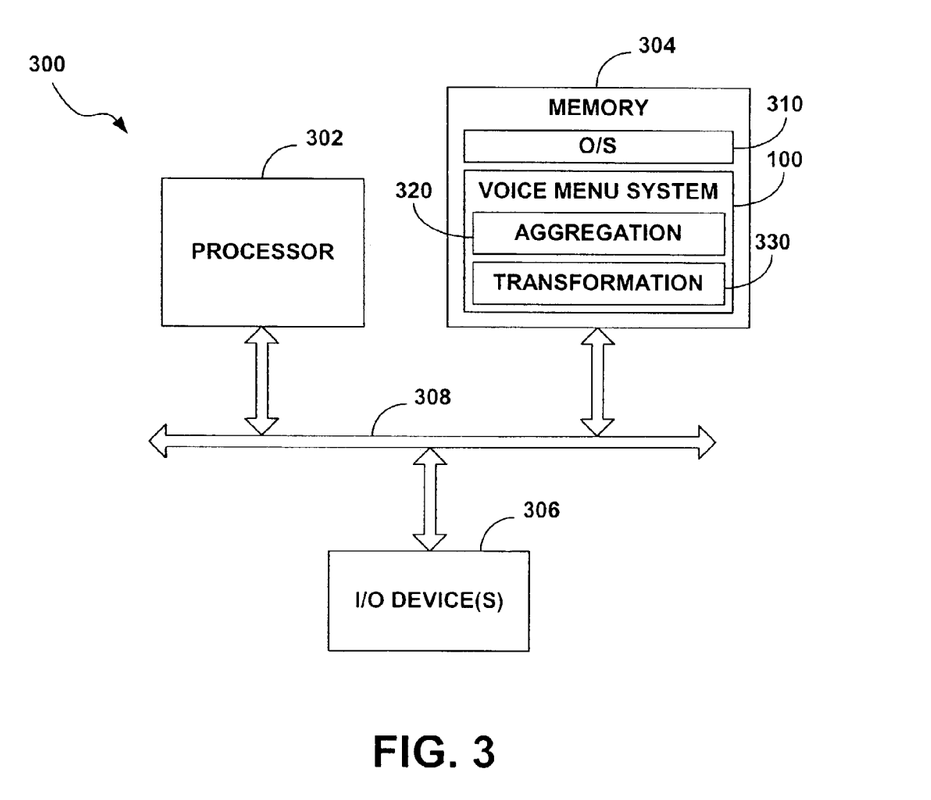
FIG. 3 is a block diagram of a computer or processor-based system that can be used to implement the embodiment of the voice menu system of FIG. 1.

When implemented in software, voice menu system 100 can be a program that is executable by a digital computer, an example of which is schematically depicted in FIG. 3. In FIG. 3, computer 300 includes a processor 302, memory 304, and one or more input and/or output (I/O) devices 306 that are communicatively coupled via a local interface 308. Processor 302 can be a hardware device configured to execute software that can be stored in memory 304. Memory 304 can include any combination of volatile memory elements and/or nonvolatile memory elements. Moreover, memory 304 can incorporate electronic, magnetic, optical, and/or other types of storage media. Note that memory 304 can have a distributed architecture, where various components are situated remote from one another, but can be accessed by processor 302.

The software in memory 304 can include one or more separate programs, each of which comprises an ordered listing of executable instructions for implementing logical functions. The software in the embodiment of memory 304 shown includes voice menu system 100 and a suitable operating system (O/S) 310. The operating system 310 controls the execution of computer programs, such as voice menu system 100, and, optionally, other computer programs.

Note, voice menu system 100 of FIG. 3 comprises an aggregation system 320 and a transformation system 330. The aggregation system 320 facilitates retrieval of content from sources, and the transformation system 330 modifies the content so that a voice dialog can be provided to a user. Functionality of the embodiments of aggregation system 320 and the transformation system 330 will be described in detail later.

The I/O device(s) 306 can include input devices, such as a keypad, and/or output devices, such as a display device. I/O device(s) 306 may further include devices that are configured to communicate both inputs and outputs, such as a communication interface.

When voice menu system 100 is implemented in software, it should be noted that the voice menu system can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. Voice menu system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can store, communicate, propagate or transport a program for use by or in connection with an instruction execution system, apparatus, or device. Thus, a computer-readable medium can be, for example but not limited to, an electronic, magnetic, optical, electromagnetic, infrared, or semiconductor system, apparatus, device, or propagation medium. More specific examples (a nonexhaustive list) of a computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program could be electronically captured, via optical scanning of the paper or other medium, then compiled, interpreted or otherwise processed in a suitable manner, if necessary, and then stored in a computer memory.

Reference will now be made to the flowchart of FIG. 4, which depicts the functionality of an embodiment of an aggregation system 320. In this regard, each block of the flowchart represents a module segment or portion of code that comprises one or more executable instructions for implementing the specified logical function(s). It should also be noted that in some alternative implementations the functions noted in various blocks of FIG. 4, or any other of the accompanying flowcharts, may occur out of the order in which they are depicted. For example, two blocks shown in succession in FIG. 4 may, in fact, be executed substantially concurrently. In other embodiments, the blocks may sometimes be executed in the reverse order depending upon the functionality involved. Additionally, or alternatively, functionality of one or more blocks may be entirely omitted.

Figure 4:
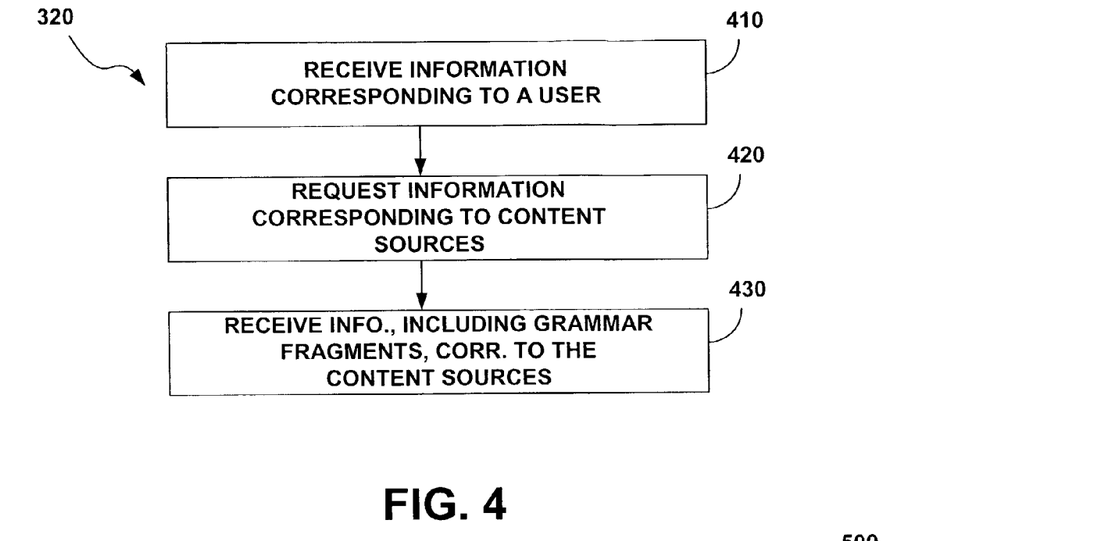
FIG. 4 is a flowchart depicting functionality of an embodiment of an aggregation system in accordance with the invention.

As shown in FIG. 4, the functionality (or method) 320 may be construed as beginning at block 410, where information corresponding to a user is received. In block 420, information corresponding to multiple content sources is requested. More specifically, the aggregation system facilitates communication with the content sources so that the content sources are able to provide information to the voice menu system. Thereafter, such as depicted in block 430, information, which typically includes grammar fragments, is received from each of the content sources.

Figure 5:
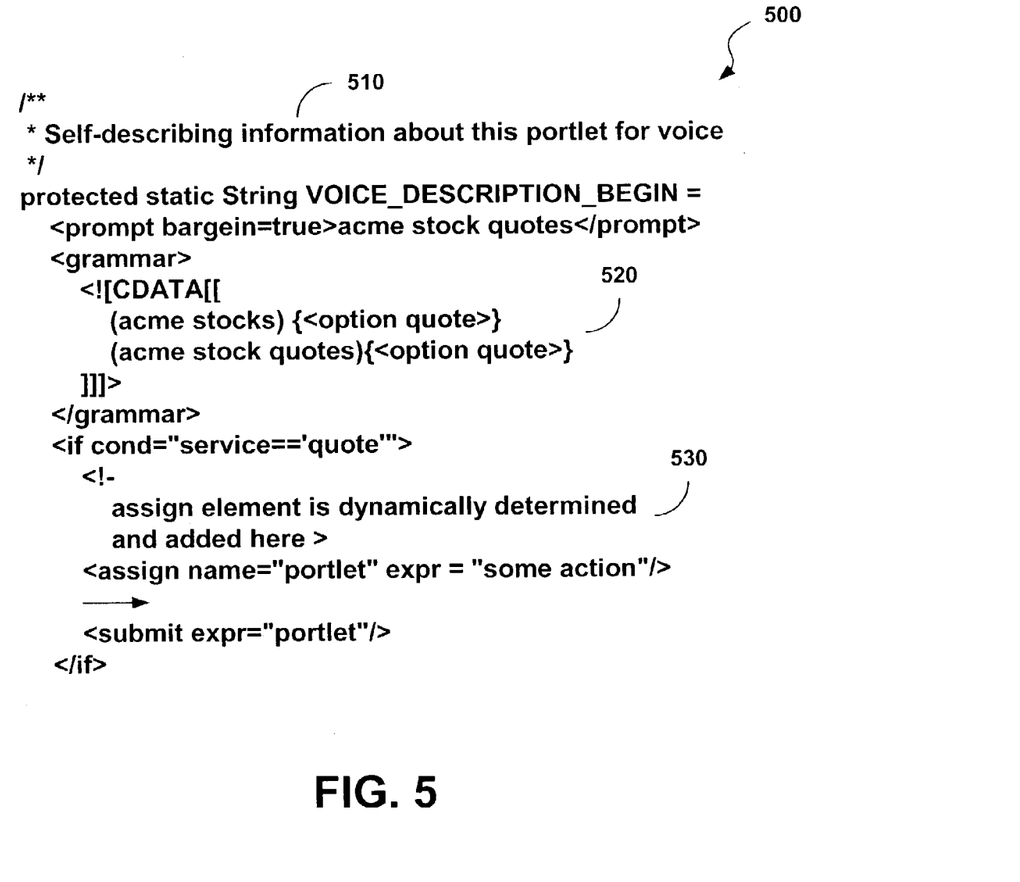
FIG. 5 is a portion of code representative of information that can be provided by a voice portlet.

An example of information that can be provided from a content source in response to a request from a voice menu system 100 is depicted in FIG. 5. In particular, FIG. 5 represents a VoiceXML snippet 500 that includes a title 510, a speech grammar recognition fragment ("grammar fragment") 520, and a result action 530. Clearly, information in addition to, or in lieu of, that shown in FIG. 5 could be provided by the content source. There also is no particular requirement that the information be provided in a VoiceXML format.

Figure 6:
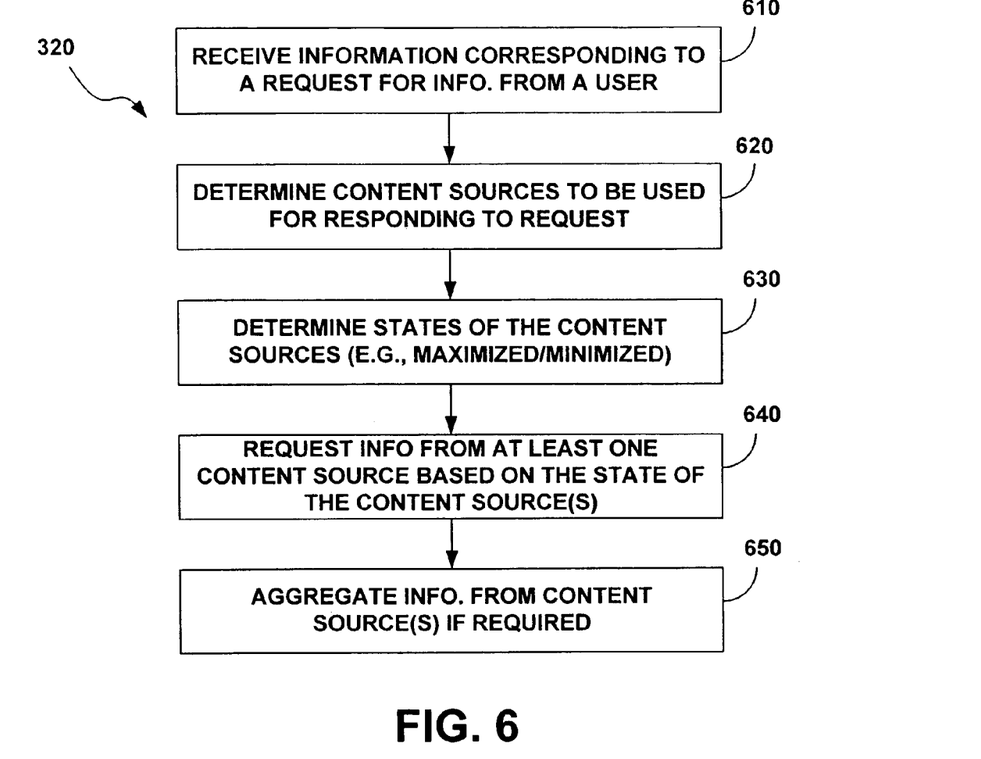
FIG. 6 is a flowchart depicting functionality of another embodiment of an aggregation system in accordance with the invention.

As shown in FIG. 6, the functionality (or method) 320 of another embodiment of the aggregation system may be construed as beginning at block 610, where information corresponding to a request for information is received. In block 620, content sources to be used for responding to the request are identified. By way of example, a portal associated with a voice menu system 100 can contact content sources designated by the manager of the voice menu system. For instance, a portal could use a first designated portlet for obtaining sports information, while using a second designated portlet for obtaining weather information. In contrast, some embodiments can enable a user to select one or more content sources from which content is to be retrieved. In such an embodiment, user preferences corresponding to particular portlets can be obtained from a user. These user preferences can be saved in a database, for example, so that, when the user contacts the portal, information corresponding to the user preferences can be accessed. The user preferences then can be used to instruct the voice menu system about which portlets are to be contacted for retrieving information. By way of example, in one embodiment, information corresponding to the states of portlets from which content was acquired can be stored. In such an embodiment, if the information indicates that a content source was maximized in association with a previous request for content by the user, content from that content source can be provided to the user in response to the next request.

In some embodiments, a user can perform a log-in to initiate use of user-designated content sources. For example, if the user properly logs-in, user preferences can be used to designate content sources. If, however, the user is not able to log-in properly, the user may be provided with standard services. Such standard services may include information being provided by content sources selected by the portal manager, for example. Thus, various levels of service differentiation can be provided.

Regardless of the particular manner used for determining content sources, once the content sources are identified, the process preferably proceeds to block 630, where states of the respective content sources are determined. For instance, a determination is made as to whether each content source exhibits a maximized, normalized or minimized state. A "minimized" state refers to a portlet from which only self-describing information of that portlet is being used by a portal. In contrast, a "maximized" state refers to a portlet from which self-describing information of, and additional information provided by, that portlet is being used by a portal. Typically, information from other portlets is not accessible to a user when a portlet exhibits a maximized state. A "normalized" state refers to a portlet that is providing more information to a portal than would be provided if the portlet exhibited a minimized state, and less information than would be provided if the portlet exhibited a maximized state. Note, state transitions of portlets typically are driven by portals, and that a portlet may simultaneously exhibit multiple states. That is, a portlet can be minimized as to one portal while being maximized as to another portal.

Returning to the flowchart of FIG. 6, in block 640, information from at least one content source is requested. More specifically, based on the state of the content source, information is requested by the aggregation system 320. For instance, in some embodiments, if the state of each of the content sources identified is minimized, information is requested from all of the content sources. In such an embodiment, if one or more of the content sources does not exhibit a minimized state, information is obtained only from the content sources that are not minimized. In this manner, if one of the content sources is maximized, information is obtained only from that content source. Stated differently, if the identified content sources all exhibit minimized states, each of the content sources provide self-describing information (such as depicted in FIG. 5) to the aggregation system.

In some embodiments, if a content source is maximized, e.g., a user desires to receive information from that content source only, a request can be directed to that content source so that information from that content source is provided to the user. In such an example, construction of a menu by the voice menu system can be bypassed. This is because content provided by a single source typically is structured in a format that does not require a dynamically-formed menu for enabling user interoperability.

Once information is received from the content sources, the information can be compiled, such as depicted in block 650, for use by a transformation system 330. Functionality of an embodiment of a transformation system 330 will now be described with respect to the flowchart of FIG. 7.

Figure 7:
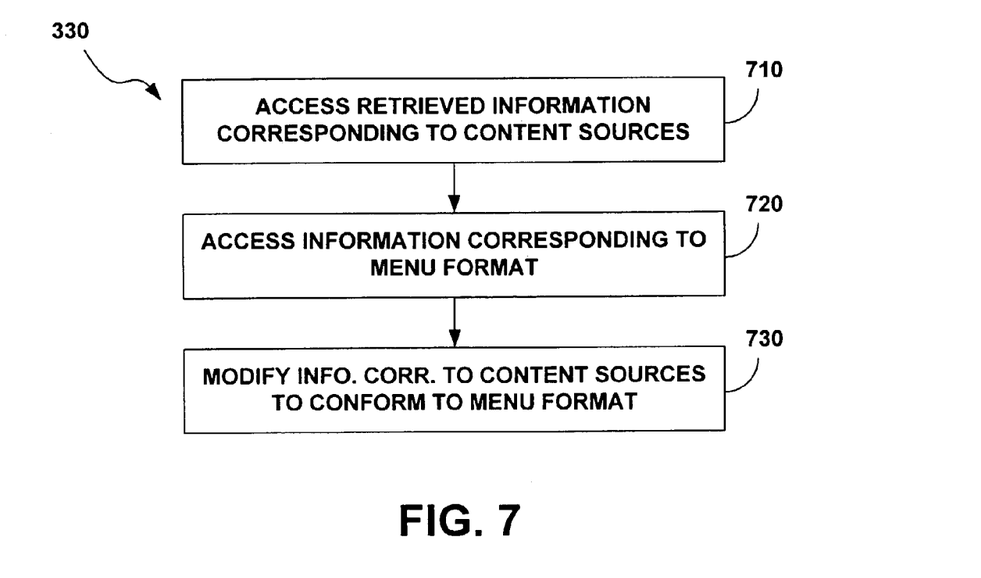
FIG. 7 is a flowchart depicting functionality of an embodiment of a transformation system in accordance with the invention.

As shown in FIG. 7, the functionality (or method) 330 may be construed as beginning at block 710, where retrieved information corresponding to content sources is accessed. In block 720, information corresponding to a menu format is accessed. Thereafter, such as depicted in block 730, information corresponding to each of the content sources is modified, if required, to conform to the menu format. As mentioned before, this enables formatted information to be provided to a voice gateway so that an audible menu can be provided to a user.

Figure 8:
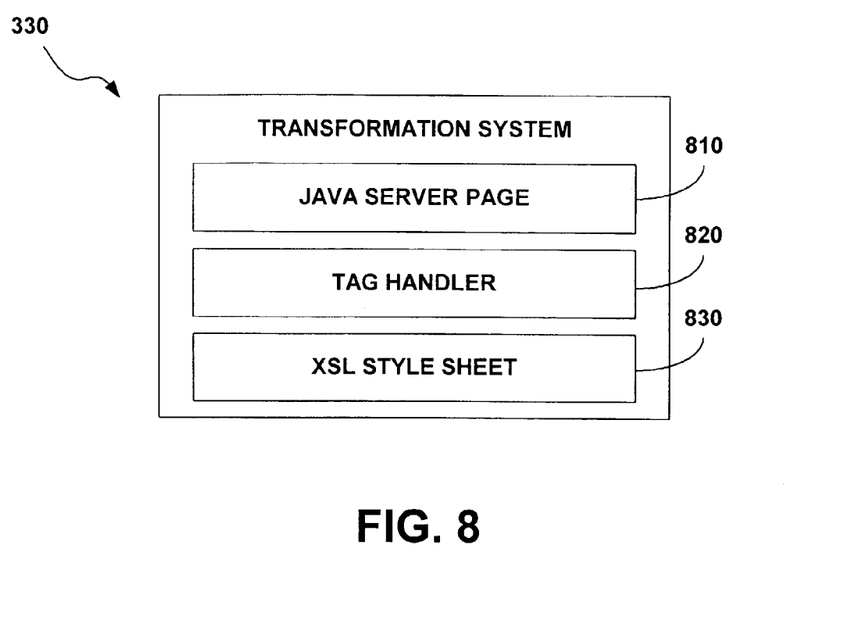
FIG. 8 is a block diagram depicting structure associated with an embodiment of a transformation system in accordance with the invention.

An embodiment of a transformation system 330 will now be described with respect to FIG. 8. As shown in FIG. 8, transformation system 330 includes a Java server page 810, a tag handler 820, and a style sheet 830. The Java server page 810 is a text document that is dynamically compiled by the voice menu system 100 to form a Java servlet (not shown). The Java servlet is a component model for creating dynamic menu content. More specifically, the Java servlet can be dynamically modified by use of the tag handler 820, which, via the open Java architecture, enables third party users to modify the Java server page without inserting code into the page. The data contained in the Java server page also is amenable to XSL transformation. In particular, the data can be transformed to conform with a format presented by the XSL style sheet 830. Clearly, other open architectures could be used.

Figure 9:
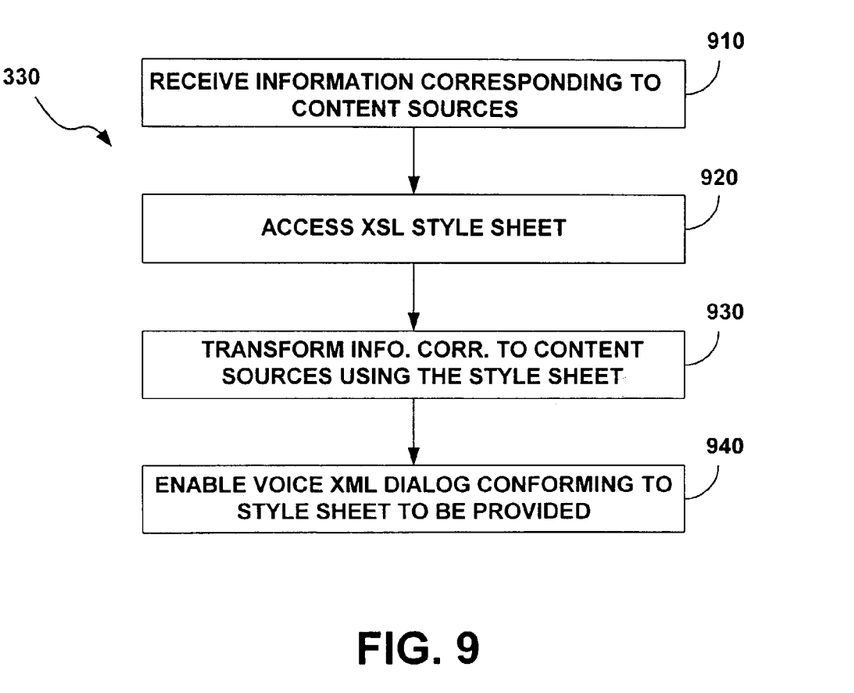
FIG. 9 is a flowchart depicting functionality of the embodiment of the transformation system of FIG. 8.

Functionality of the embodiment of the transformation system of FIG. 8 is depicted in the flowchart of FIG. 9. As shown in FIG. 9, the functionality (or method) may be construed as beginning at block 910, where information corresponding to content sources is received. In block 920, an XSL style sheet is accessed. Thereafter, such as depicted in block 930, information corresponding to each of the content sources is transformed using the style sheet. In block 940, a VoiceXML dialog conforming to the style sheet is enabled to be provided by the transformation system.

An example of code corresponding to Java server page 810 is depicted in FIG. 10. As shown in FIG. 10, the code includes a conditional for text 1010, as well as a conditional for voice 1020. In particular, the conditional for voice 1020 includes various elements for implementing functionality of this embodiment of the transformation system. In particular, page tag 1030 corresponds to a VoiceXML dialog, window tag 1040 corresponds to a portlet, layout tag 1050 corresponds to a mechanism for controlling portal interaction with portlets, and transform 1060 corresponds to tag handler 820 of FIG. 8. Note, layout tag 1050 typically is responsible for initiating portal content with a page (portlet).

Figure 11:
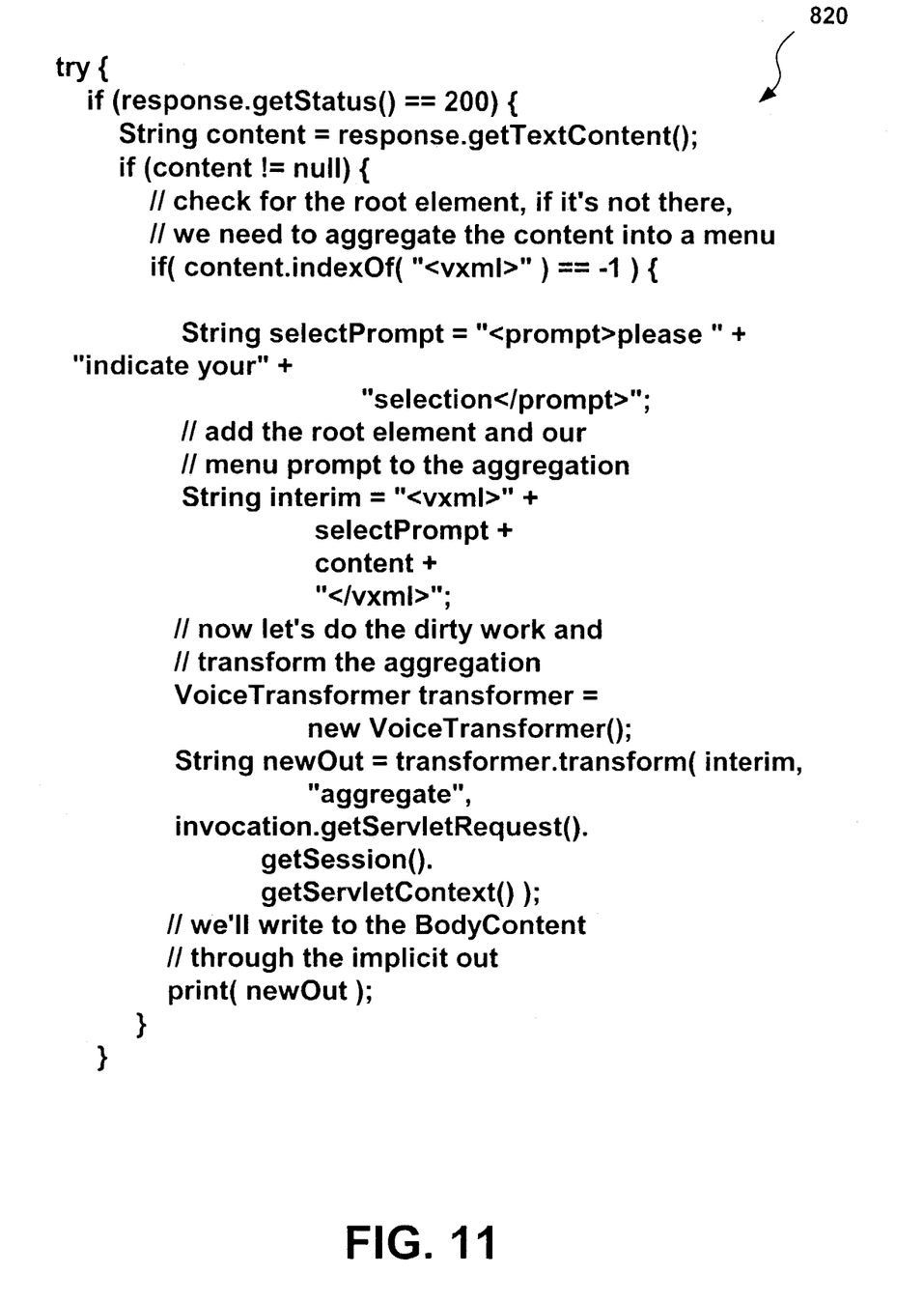
FIG. 11 is a portion of code representative of the embodiment of the tag handler of FIG. 8.

An embodiment of tag handler 820 is depicted in FIG. 11. As shown in FIG. 11, the tag handler detects whether transformation of information acquired from content sources is required. Note, transformation may not be required in some embodiments unless all of the content sources exhibit minimized states. That is, in some embodiments, if one or more of the content sources exhibits a normalized or maximized state, transformation may not be required as information may be provided to the user from the content source that is normalized or maximized. Since the information is being provided from the normalized or maximized content source, a menu corresponding to multiple content sources may not be provided to the user until all of the content sources are driven to minimized states.

Figure 12:
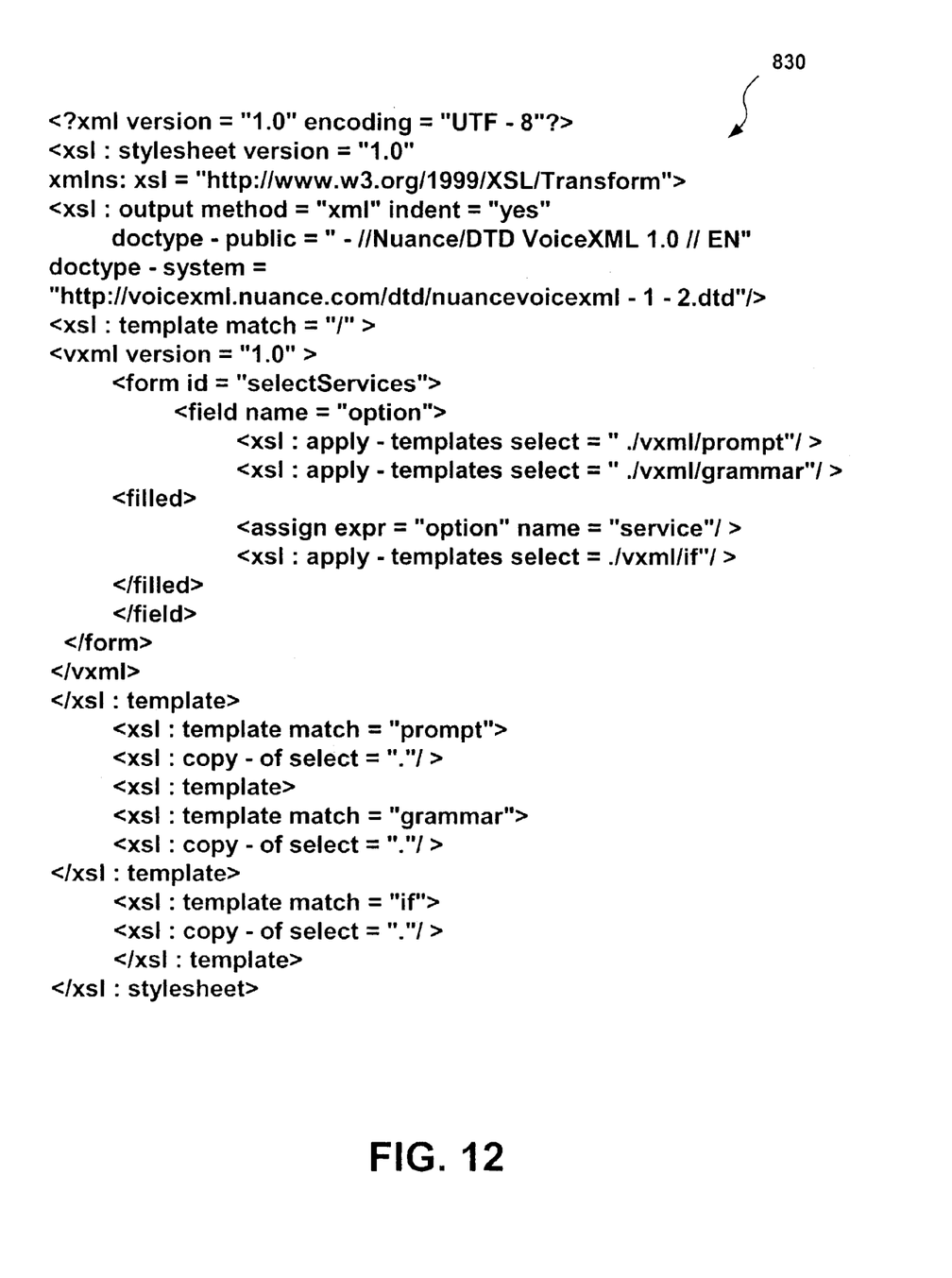
FIG. 12 is a portion of code representative of the embodiment of the style sheet of FIG. 8.

If it is determined that a transformation is required, the tag handler 820 applies an XSL transform by using XSL style sheet 830 to restructure the information contained in the Java server page 810. An example of an XSLT file that includes an XSLT style sheet is depicted in FIG. 12. Note, various formats of XSL style sheets other than that depicted in FIG. 12 can be used.

Figure 13:
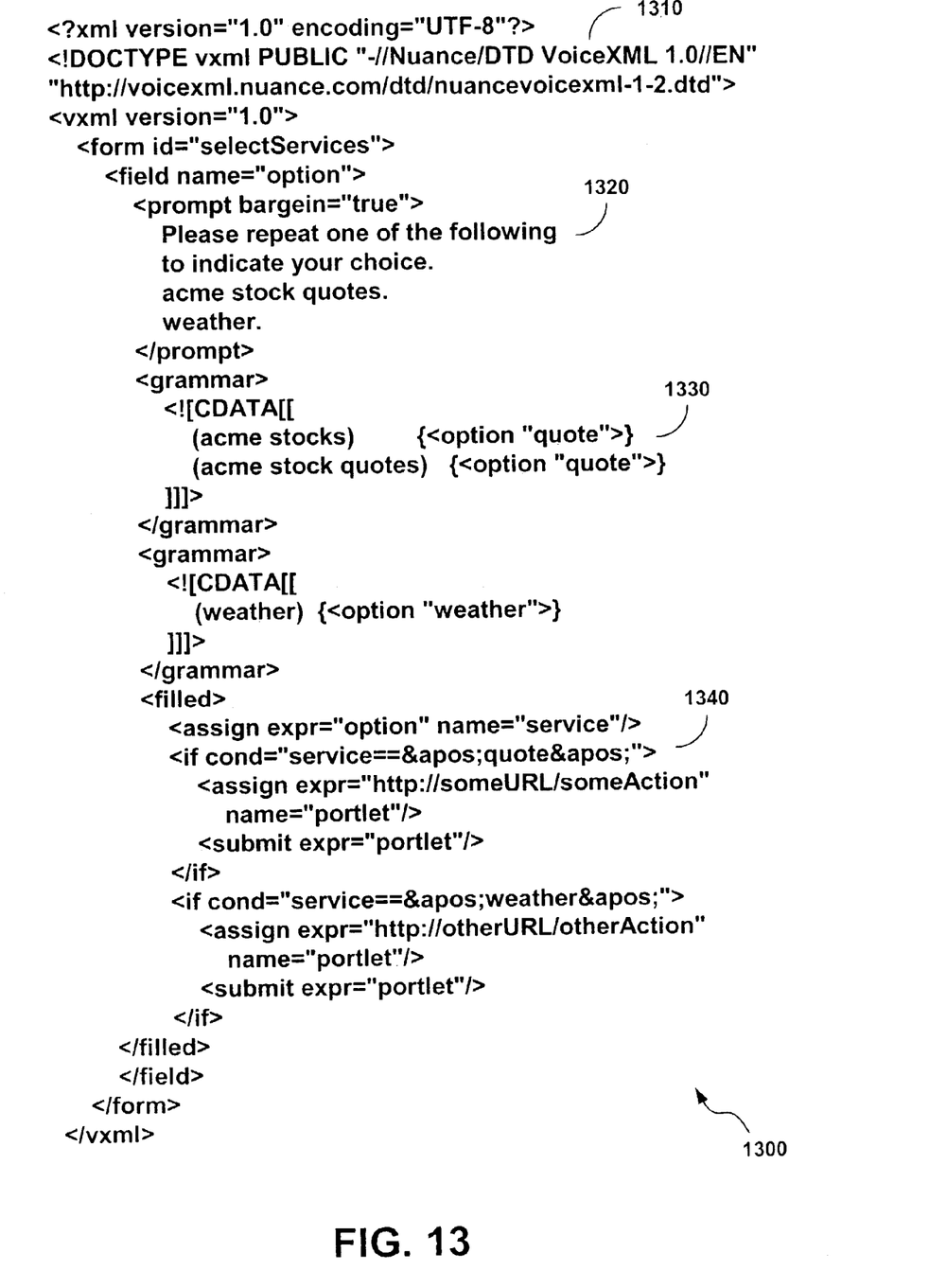
FIG. 13 is a portion of code representative of the output of the embodiment of the transformation system of FIG. 8.

FIG. 13 depicts the output 1300 produced by restructuring data received from content sources so that the data conforms with the XSL style sheet of FIG. 12. As shown in FIG. 13, this output is a consumable VoiceXML document that can be executed by a voice gateway. Specifically, the output 1300 includes a declaration 1310 that describes the information as being a VoiceXML document. The form portion 1320 of the output contains information that is to be provided to a user in audible form. The grammar section 1330 indicates those voice prompts that, if provided by the user in the form of a voice command, prompts the voice menu system to perform a particular action. For instance, the grammar filled conditional 1340 indicates that, if the user speaks the appropriate words, a particular portlet will be contacted for information. More specifically, the portlet identified would be placed in a maximized state and corresponding information would be retrieved from the portlet and provided to the user.

One of the embodiments described herein associates minimized portlet states with construction of a menu. In some embodiments, initial contact of a user with a portal operating a voice menu system, however, can cause all portlets communicating with that portal to be minimized. Thus, construction of a menu could be initiated after the portal drives the portlets to minimized states.

The invention claimed is:

1. A method for providing a user with information in audible form, said method comprising:
    determining content sources from which information is to be retrieved for responding to the request;
    retrieving grammar fragments corresponding to the content sources determined;
    providing a menu format including information for providing the grammar fragments to the user in audible form; and
    aggregating the grammar fragments retrieved such that the grammar fragments can be provided to the user in audible form in conformance with the menu format,
    wherein retrieving grammar fragments comprises:
    determining states exhibited by the content sources; and
    retrieving grammar fragments based, at least in part, upon the states exhibited.

2. The method of claim 1, wherein retrieving grammar fragments comprises:
    retrieving grammar fragments from only those content sources which exhibit minimized states.

3. The method of claim 2, further comprising:
    enabling the states of the content sources to exhibit minimized states such that grammar fragments can be retrieved from the content sources.

4. The method of claim 1, wherein determining content sources comprises:
    enabling the user to designate at least some of the content sources from which information is to be retrieved.

5. The method of claim 1, wherein the menu format corresponds to an XSLT style sheet; and
    further comprising:
    performing an XSL transformation with respect to the grammar fragments using the XSLT style sheet.

6. The method of claim 1, wherein retrieving grammar fragments comprises:
    compiling the grammar fragments as entries in a VoiceXML text document.

7. The method of claim 1, wherein determining content sources from which information is to be retrieved comprises:
    accessing user data corresponding to user preferences; and
    identifying content sources associated with the user data.

8. The method of claim 7, wherein user preferences correspond to content sources and respective content source states corresponding to a previous request for information from the user; and
    further comprising:
    enabling information corresponding to the content source that was maximized to be provided to the user if the user data indicates that the content source was maximized in association with such previous request.

9. The method of claim 7, wherein, if the user data indicates that the content source was maximized, the information corresponding to the content source is enabled to be provided to the user without the accessing and aggregating steps being performed.

10. The method of claim 1, further comprising:
    modifying the menu format to form a modified menu format such that a menu containing information corresponding to the grammar fragments, and complying with the modified menu format, is enabled to be provided to the user in audible form.

11. The method of claim 1, further comprising:
    receiving information corresponding to a request for information from a user.

12. The method of claim 1, wherein retrieving grammar fragments comprises:
    retrieving grammar fragments from only those content sources that exhibit maximized states.

13. A system for providing a user with information in audible form, said system comprising:
    means for determining content sources from which information is to be retrieved for responding to a request from a user;
    means for retrieving grammar fragments corresponding to the content sources determined;
    means for providing a menu format including information for providing the grammar fragments to the user in audible form; and
    means for aggregating the grammar fragments retrieved such that the grammar fragments can be provided to the user in audible form in conformance with the menu format;
    wherein said means for retrieving grammar fragments is operative to retrieve grammar fragments from content sources based, at least in part, upon exhibit states of the content sources.

14. The system of claim 13, further comprising:
    means for receiving the information corresponding to the request for information from the user.

15. The system of claim 13, wherein said means for retrieving grammar fragments is operative to retrieve grammar fragments from only those content sources which exhibit minimized states.

16. The system of claim 15, further comprising:
    means for enabling the states of the content sources to exhibit minimized states such that grammar fragments can be retrieved from the content sources.

17. The system of claim 13, wherein the menu format corresponds to an XSLT style sheet; and
    further comprising:
    means for performing an XSL transformation with respect to the grammar fragments using the XSLT style sheet.

18. The system of claim 13, wherein said means for retrieving grammar fragments is operative to retrieve grammar fragments from only those content sources that exhibit maximized states.

19. A system for providing a user with information in audible form, said system comprising:
    a menu format including information for providing grammar fragments to a user in audible form; and
    a voice menu system configured to communicate with a communication network, said voice menu system being operative to determine content sources from which information is to be retrieved for responding to a request from a user, determining states exhibited by the content sources, retrieve grammar fragments corresponding to the content sources based, at least in part, upon the states exhibited, and aggregate the grammar fragments retrieved such that the grammar fragments can be provided to the user in audible form in conformance with the menu format.

20. The system of claim 19, further comprising:
    a memory storage device communicatively coupled to the voice menu system, the menu format being stored by the memory storage device.

21. The system of claim 19, wherein the menu format corresponds to an XSLT style sheet; and
    wherein said voice menu system is operative to perform an XSL transformation with respect to the grammar fragments using the XSLT style sheet.

22. The system of claim 19, wherein said voice menu system is operative to compile information corresponding to the grammar fragments as entries in a VoiceXML text document.

23. The system of claim 19, wherein said voice menu system is constructed with an open architecture such that the menu format can be modified to form a modified menu format, the modified menu format enabling a menu containing information corresponding to the grammar fragments and complying with the modified menu format to be provided to the user in audible form.

24. The system of claim 19, wherein the voice menu system is further operative to retrieve grammar fragments from only those content sources that exhibit minimized states.

25. The system of claim 19, wherein the voice menu system is further operative to retrieve grammar fragments from only those content sources that exhibit maximized states.

26. A computer-readable medium having a computer program for providing a user with information in audible form, said computer program comprising:
   logic configured to determine content sources from which information is to be retrieved for responding to a request from a user;
   logic configured to retrieve grammar fragments corresponding to the content sources based, at least in part, on states exhibited by the content sources;
   logic configured to provide a menu format including information for providing the grammar fragments to the user in audible form; and
   logic configured to aggregate the grammar fragments retrieved such that the grammar fragments can be provided to the user in audible form in conformance with the menu format.

27. The computer-readable medium of claim 26, further comprising:
   logic configured to enable the states of the content sources to exhibit minimized states such that grammar fragments can be retrieved from the content sources.

28. The computer-readable medium of claim 26, wherein said logic configured to determine content sources is operative to enable the user to designate at least some of the content sources from which information is to be retrieved.

29. The computer-readable medium of claim 26, wherein the menu format corresponds to an XSLT style sheet; and further comprising:
   logic configured to perform an XSL transformation with respect to the grammar fragments using the XSLT style sheet.

30. The computer-readable medium of claim 26, wherein said logic configured to retrieve grammar fragments is operative to compile the grammar fragments as entries in a VoiceXML text document.

31. The computer-readable medium of claim 26, wherein said logic configured to determine content sources from which information is to be retrieved comprises:
   logic configured to access user data corresponding to user preferences; and
   logic configured to identify content sources associated with the user data.

32. The computer-readable medium of claim 31, wherein user preferences correspond to content sources and respective content source states associated with a previous request for information from the user; and
   further comprising:
   logic configured to enable information corresponding to a content source that was maximized to be provided to the user if the user data indicates that the content source was maximized in association with such previous request.

33. The computer-readable medium of claim 26, further comprising:
   logic configured to modify the menu format to form a modified menu format such that a menu containing information corresponding to the grammar fragments, and complying with the modified menu format, is enabled to be provided to the user in audible form.

* * * * *